US008626067B2

(12) United States Patent
Ko et al.

(10) Patent No.: US 8,626,067 B2
(45) Date of Patent: Jan. 7, 2014

(54) SYSTEM AND METHODS FOR ENHANCING COEXISTENCE EFFICIENCY FOR MULTI-RADIO TERMINALS

(75) Inventors: Li-Chun Ko, Taipei (TW); Hong-Kai Hsu, Yonghe (JP); I-Kang Fu, Taipei (TW); Chi-Chen Lee, Taipei (TW)

(73) Assignee: Mediatek Inc. (TW)

( * ) Notice: Subject to any disclaimer, the term of this patent is extended or adjusted under 35 U.S.C. 154(b) by 617 days.

(21) Appl. No.: 12/925,475

(22) Filed: Oct. 22, 2010

(65) Prior Publication Data
US 2011/0097998 A1  Apr. 28, 2011

Related U.S. Application Data

(60) Provisional application No. 61/254,771, filed on Oct. 26, 2009.

(51) Int. Cl.
*H04B 7/00* (2006.01)
(52) U.S. Cl.
USPC .......................................... 455/41.2; 455/509
(58) Field of Classification Search
USPC ............... 455/63.1, 67.11, 78, 73, 41.2, 41.3, 455/553.1, 166.1, 88, 509, 550.1, 552.1
See application file for complete search history.

(56) References Cited

U.S. PATENT DOCUMENTS

| 2007/0263709 | A1 | 11/2007 | Kasslin et al. ................. 375/222 |
| 2008/0139212 | A1 | 6/2008 | Chen et al. .................. 455/432.1 |
| 2008/0247445 | A1 | 10/2008 | Guo et al. ..................... 375/220 |
| 2009/0003307 | A1 | 1/2009 | Yang et al. ..................... 370/350 |
| 2009/0054009 | A1 | 2/2009 | Yang et al. ....................... 455/78 |
| 2009/0080401 | A1 | 3/2009 | Zhu et al. ....................... 370/343 |
| 2009/0086712 | A1 | 4/2009 | Liu et al. ........................ 370/350 |
| 2009/0196210 | A1 | 8/2009 | Desai ............................. 370/311 |
| 2009/0291701 | A1 | 11/2009 | Zetterman et al. ............. 455/509 |
| 2009/0312010 | A1 | 12/2009 | Hall ............................ 455/426.1 |
| 2010/0061326 | A1 | 3/2010 | Lee et al. ....................... 370/329 |
| 2010/0197234 | A1 | 8/2010 | Linde et al. .................. 455/63.1 |
| 2011/0097998 | A1 | 4/2011 | Ko et al. ....................... 455/41.2 |

FOREIGN PATENT DOCUMENTS

| CH | 101646245 A | 2/2010 |
| CN | 101444006 A | 5/2009 |
| WO | WO 2008/070777 | 6/2008 |

OTHER PUBLICATIONS

International Search Report and Written Opinion of International Search Authority for PCT/CN2011/077397 dated Oct. 27, 2011 (11 pages).
International Search Report and Written Opinion of International Search Authority for PCT/CN2010/078127 dated Feb. 10, 2011 (12 pages).

*Primary Examiner* — Eugene Yun
(74) *Attorney, Agent, or Firm* — Zheng Jin

(57) ABSTRACT

A method of scheduling transmitting and receiving communication slots for co-located radio devices is provided. A Bluetooth (BT) device first synchronizes its communication time slots with a co-located radio module, and then obtains the traffic pattern of the co-located radio module. Based on the traffic pattern, the BT device selectively skips one or more TX or RX time slots to avoid data transmission or reception in certain time slots and thereby reducing interference with the co-located radio module. In addition, the BT device generates a co-located coexistence (CLC) bitmap and transmits the CLC bitmap to its peer BT device such that the peer BT device can also skip data transmission or reception in certain time slots affected by the co-located radio module. The skipped time slots are disabled for TX or RX operation to prevent interference and to achieve more energy saving.

27 Claims, 10 Drawing Sheets

SYSTEM AND METHODS FOR ENHANCING COEXISTENCE EFFICIENCY FOR MULTI-RADIO TERMINALS

CROSS REFERENCE TO RELATED APPLICATIONS

This application claims priority under 35 U.S.C. §119 from U.S. Provisional Application No. 61/254,771, entitled "Systems and Methods for Enhancing BT, LTE, and WiMAX Coexistence Efficiency," filed on Oct. 26, 2009, the subject matter of which is incorporated herein by reference.

TECHNICAL FIELD

The disclosed embodiments relate generally to wireless network communications, and, more particularly, to Multi-Radio Terminals (MRT) containing Bluetooth (BT) and Mobile Wireless Systems (MWS) radios.

BACKGROUND

The Institute of Electrical and Electronics Engineers (IEEE) has adopted a series of standards for both wireless local area networks (WLANs) known as 802.11 and wireless metropolitan area networks (WMANs) known as 802.16. It is commonly known that WiFi refers to interoperable implementations of the IEEE 802.11 technology, and WiMAX (worldwide interoperability for microwave access) refers to interoperable implementations of the IEEE 802.16 technology. On the other hand, Bluetooth is a wireless standard for wireless personal area networks (WPANs) developed by the Bluetooth special interest group (SIG). Bluetooth provides a secure way for exchanging data over short distances using frequency-hopping spread spectrum technology. Due to scarce radio spectrum resource, different technologies may operate in overlapping or adjacent radio spectrums. For example, WiFi often operates at 2.412-2.4835 GHz, WiMAX often operates at 2.3-2.4 or 2.496-2.690 GHz, and Bluetooth often operates at 2.402-2.480 GHz.

As the demand for wireless communication continues to increase, wireless communication devices such as cellular telephones, personal digital assistants (PDAs), laptop computers, etc., are increasingly being equipped with multiple radios. A multiple radio terminal (MRT) may simultaneously include Bluetooth, WiMAX, and WiFi radios. Simultaneous operation of multiple radio modules co-located on the same physical device, however, can suffer significant degradation including significant interference between them because of the overlapping or adjacent radio spectrums. Due to physical proximity and radio power leakage, when the transmission of data for a first radio module overlaps with the reception of data for a second radio module in time domain, the second radio module reception can suffer due to interference from the first radio module transmission. Likewise, data transmission of the second radio module can interfere with data reception of the first radio module.

FIG. 1 (Prior Art) is a diagram that illustrates interference between a mobile wireless system (MWS) radio module 11 and a Bluetooth (BT) master radio module 12 that are co-located in an MRT10. Both MWS11 and BT12 transmit and receive data via scheduled transmitting (TX) and receiving (RX) time slots on a frame-by-frame basis. For example, each MWS frame contains five consecutive RX slots scheduled for receiving operation followed by three consecutive TX slots scheduled for transmitting operation. On the other hand, a Time Division Duplex (TDD) scheme is used by BT devices where a BT master and a BT slave alternate TX and RX operation. Because MWS radio module 11 and BT radio module 12 are co-located within MRT10, in a general, the transmission of one radio module will interfere with the reception of another radio module. As illustrated in FIG. 1, data reception in three RX time slots of BT12 are interfered by concurrent data transmission in TX time slots of MWS11, and data reception in six RX time slots of MWS11 are interfered by concurrent data transmission in TX time slots of BT12.

FIG. 2 (Prior Art) is a diagram that illustrates traffic pattern of a BT master device 22 affected by a co-located MWS radio module 21. The traffic pattern of MWS21 remains the same as the traffic pattern of MWS11 in FIG. 1, while BT22 has an Extended Voice (EV3) traffic pattern using an Extended Synchronous Connection Oriented (eSCO) link, with $T_{eSCO}=6$ and $W_{eSCO}=4$. Under such EV3 traffic pattern, BT22 has one scheduled TX time slot followed by one scheduled RX time slot for every six BT slots (i.e., $T_{eSCO}=6$), with four retransmission opportunities (i.e., $W_{eSCO}=4$). In the example of FIG. 2, data transmission of MWS21 interferes with data reception of BT22, while data transmission of BT22 does not interfere with data reception of MWS21 (e.g., because of low transmission power of BT22). As a result, EV3 data reception in the scheduled EV3RX time slot in eSCO window #2 is corrupted, causing BT22 to re-transmit EV3 data to a BT slave in the following EV3TX time slot and to receive EV3 data from the BT slave in the following EV3RX time slot successfully. It can be seen that BT22 consumes 25% more energy due to interference from co-located MWS21. A solution is sought to improve efficiency and save energy for radio modules co-located within the same MRT.

SUMMARY

A method of scheduling transmitting and receiving communication slots for co-located radio devices is provided. A Bluetooth (BT) device first synchronizes its communication time slots with a co-located radio module, and then obtains the traffic pattern of the co-located radio module. The traffic pattern information includes frame configuration information such as DL/UL duration, active/inactive duration, and frame length. Based on the traffic pattern, the BT device selectively skips one or more TX or RX time slots to avoid data transmission or reception in certain time slots and thereby reducing interference with the co-located radio module. The skipped time slots are disabled for TX or RX operation to prevent interference and to achieve more energy saving.

In one embodiment, the BT device generates co-located coexistence (CLC) information based on the traffic pattern information. The CLC information may be represented by a CLC bitmap, each bit of the CLC bitmap indicates whether a communication slot can be used for transmitting or receiving data. For example, in a TX CLC bitmap, each bit indicates whether data transmission of a communication slot of the BT radio module will interfere with data reception of the co-located radio module in a corresponding time slot. Similarly, in a RX CLC bitmap, each bit indicates whether data transmission of the co-located radio module will interfere with data reception of the BT device in a corresponding time slot. The generated CLC bitmap is used for selectively skipping TX or RX operation to avoid interference. The BT device then transmits the CLC bitmap to its peer BT device such that the peer BT device can also skip data transmission or reception in certain time slots affected by the co-located radio module.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
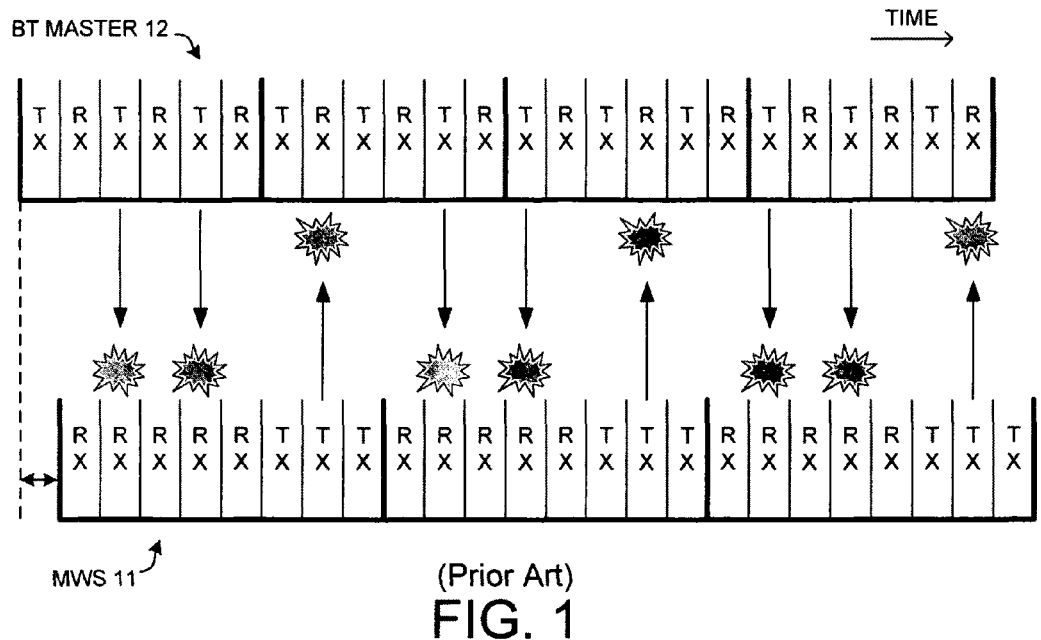
FIG. 1 (Prior Art) is a diagram that illustrates interference between a BT device and a co-located MWS radio module.
Figure 2:
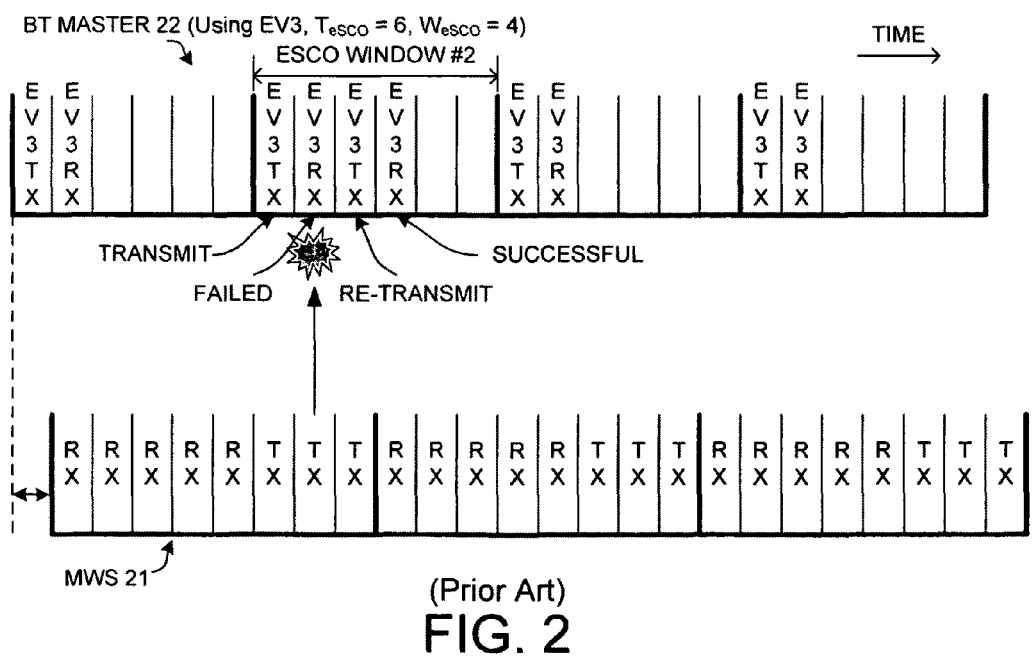
FIG. 2 (Prior Art) is a diagram that illustrates EV3 traffic pattern of a BT device affected by interference from a co-located MWS.
Figure 3:
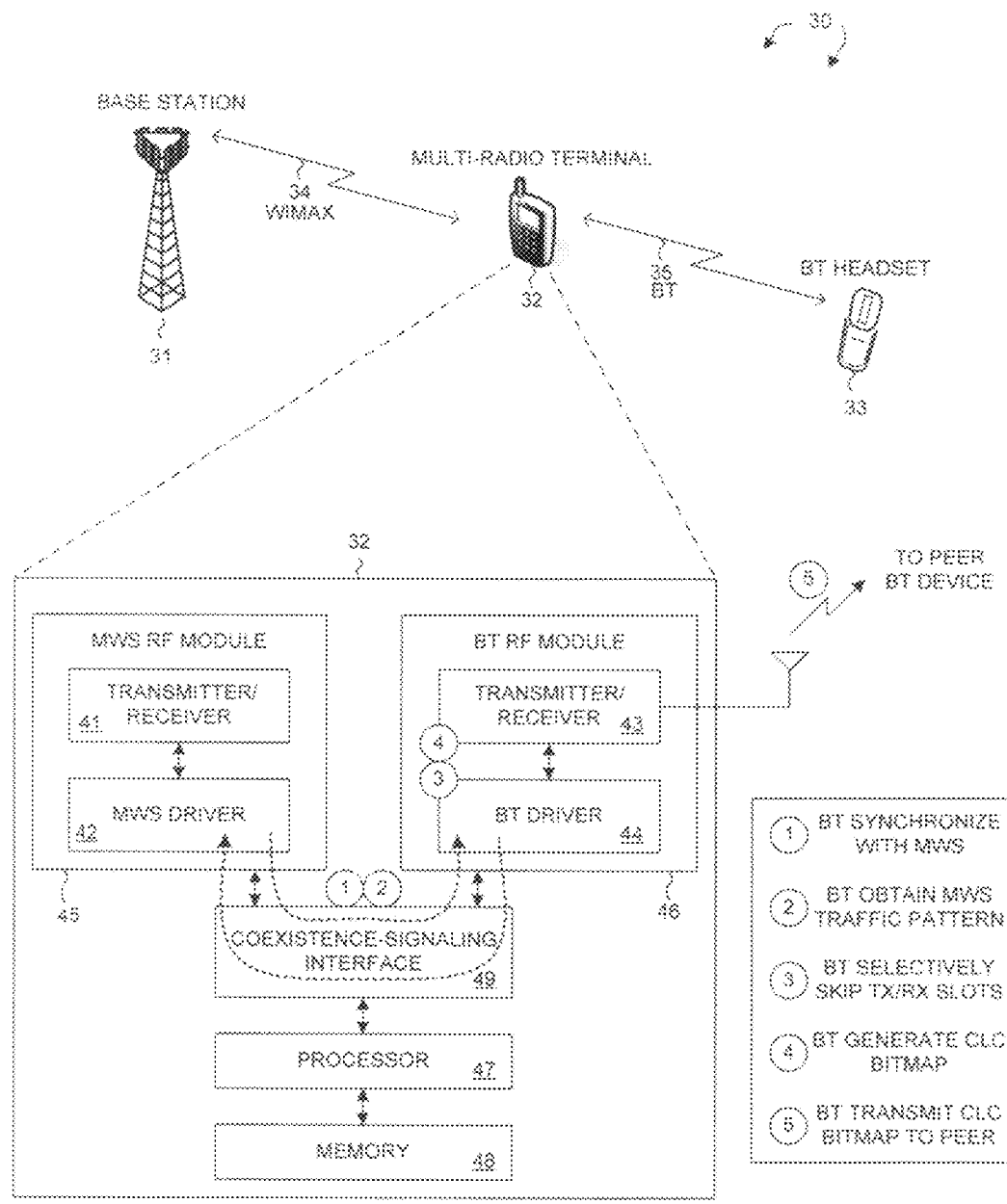
FIG. 3 illustrates a simplified block diagram of a Multi-Ratio Terminal (MRT) having a MWS radio module and a BT device in a wireless communication system in accordance with one novel aspect.

FIG. 3 illustrates a simplified block diagram of a Multi-Ratio Terminal (MRT) 32 in a wireless communication system 30 in accordance with one novel aspect. Wireless communication system 30 comprises a base station BS31, a mobile station MRT32, and a BT headset BT33. Mobile station MRT32 simultaneously includes a mobile wireless system (MWS) radio module 45 and a Bluetooth (BT) radio module 46. MRT32 communicates with its serving base station BS31 using MWS radio module 45 via a WiMAX link 34, while communicates with a BT headset BT33 using BT radio module 46 via a BT link 35. MWS radio module 45 comprises a transmitter and/or receiver 41 and an MWS driver control block 42. BT radio module 46 comprises a transmitter and/or receiver 43 and a BT driver control block 44. MWS driver 42 and BT driver 44 communicate with each other via a coexistence-signaling interface 49. Coexistence-signaling interface 49 is also connected to processor 47 and memory 48 of mobile station MRT32. Although coexistence signaling interface 49 is denoted as one module, it may include both hardware and software implementation. For example, hardware implementation may be used for timing/synchronization between MWS45 and BT46, while software implementation may be used for traffic information exchange.

In the example of FIG. 3, MWS45 is a WiMAX radio module that operates at 2.3-2.4 or 2.496-2.690 GHz, while BT46 is a BT radio module that operates at 2.402-2.480 GHz. Simultaneous operation of multiple radio modules co-located on the same physical device, however, can suffer significant degradation including significant interference between them because of the overlapping or adjacent radio spectrums. This is especially true when both MWS45 and BT46 use time division multiplexing (TDM) protocol for data communication. Under TDM mode, when a scheduled communication time slot for data transmission for a first radio module overlaps in time with a scheduled communication time slot for data reception for a second radio module, data reception of the second radio module can suffer due to interference from data transmission of the first radio module. Likewise, data transmission of the second radio module can interfere with data reception of the first radio module.

In one novel aspect, BT radio module 46 selectively skips scheduled transmitting (TX) and/or receiving (RX) time slots to improve scheduling efficiency and thereby save energy via coexistence-signaling interface 49. As illustrated in FIG. 3, BT46 first synchronizes its communication time slots with MWS45 (step 1), and then obtains the traffic pattern of MWS45 (step 2) via coexistence-signaling interface 49. The traffic pattern information includes frame configuration information such as DL/UL duration and frame length. Based on the traffic pattern, BT46 selectively skips one or more TX or RX time slots to avoid mutual interference between BT46 and MWS45 (step 3). In addition, BT46 generates a co-located coexistence (CLC) bitmap (step 4) and transmits the CLC bitmap to its peer BT device (step 5) such that the peer BT device can also skip data transmission or reception in certain time slots affected by MWS45. During the skipped time slots, TX or RX operation is given up by disabling or turning off the transmitter or receiver to achieve more energy saving. Various embodiments and examples are now described below with more details.

Figure 4:
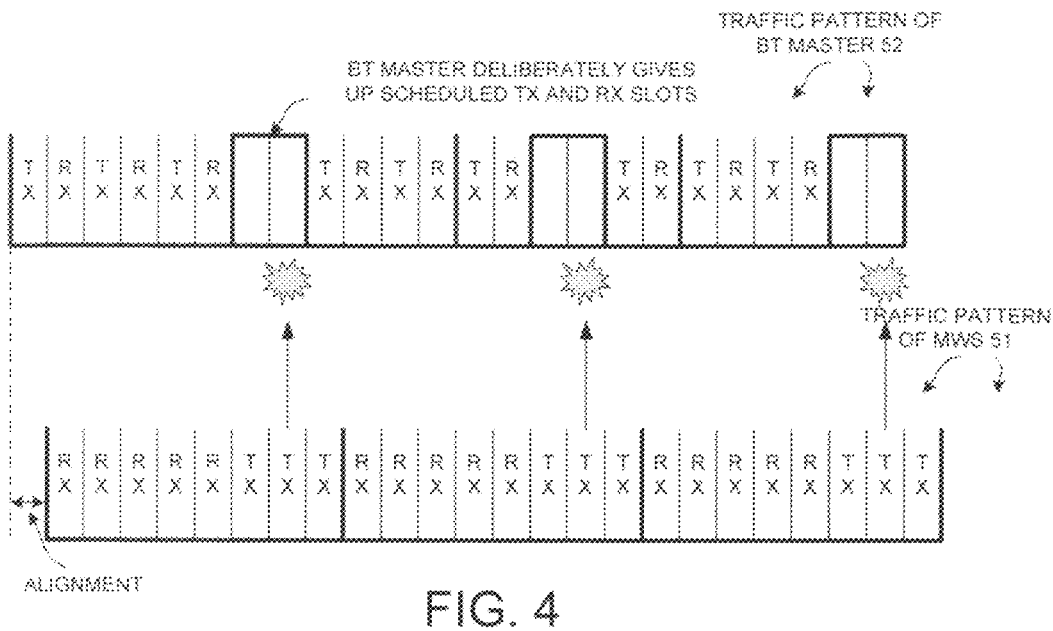
FIG. 4 illustrates a first embodiment of selectively skipping communication slots in accordance with one novel aspect.

FIG. 4 illustrates a first embodiment of selectively skipping communication slots in accordance with one novel aspect. In the example of FIG. 4, MWS radio module 51 has a typical MWS traffic pattern, each MWS frame contains eight communication slots including five consecutive RX slots followed by three consecutive TX slots. On the other hand, BT master radio module 52 has an Asynchronous Connection-Oriented (ACL) traffic pattern. A Time Division Duplex (TDD) scheme is used by BT devices where BT master and BT slave alternate TX and RX operation. The packet start shall be aligned with the slot start. BT master 52 first aligns its communication slots with MWS51 to minimize mutual interference. BT52 then obtains the traffic pattern of MWS51. Based on the obtained traffic pattern, BT master 52 deliberately gives up certain allowed TX and RX slots that will be affected by co-located MWS radio module 51 to save energy. As illustrated in FIG. 4, the TX/RX communication slots denoted by a think-lined box are originally allowed for TX and RX operation, but are now being selectively skipped because those slots will be affected by MWS51.

Figure 5:
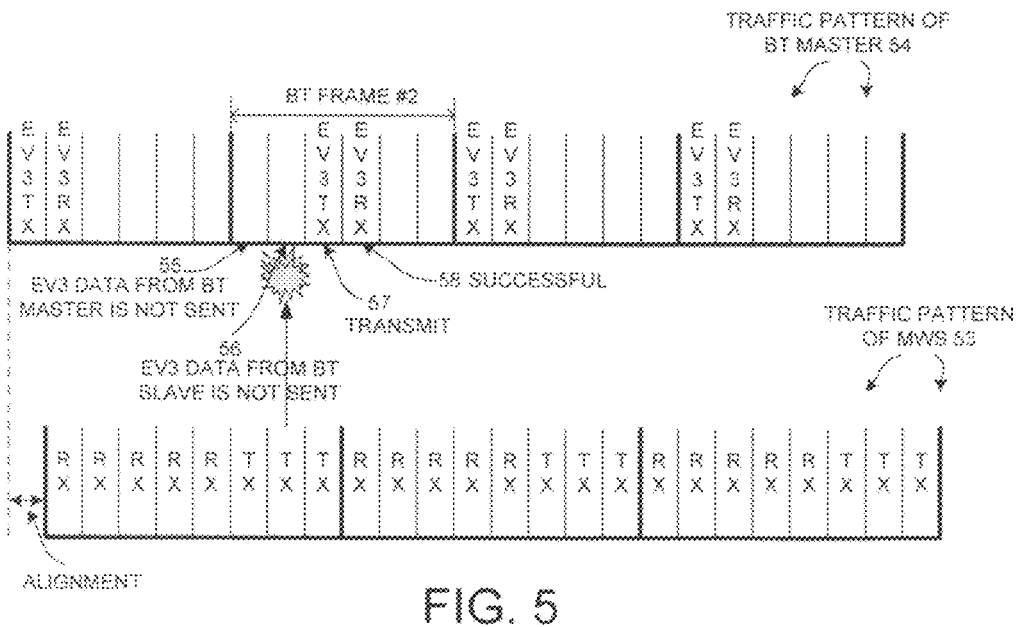
FIG. 5 illustrates a second embodiment of selectively giving up communication slots in accordance with one novel aspect.

FIG. 5 illustrates a second embodiment of selectively skipping communication slots in accordance with one novel aspect. In the example of FIG. 5, MWS radio module 53 has the same traffic pattern as MWS51 in FIG. 4, each MWS frame contains eight communication slots including five consecutive RX slots followed by three consecutive TX slots. BT master radio module 54, however, has an extended voice (EV3) traffic pattern, each eSCO window contains six communication slots (i.e., $T_{eSCO}=6$) with one reserved TX slot followed by one reserved RX slot and four retransmission time slots (i.e., $W_{eSCO}=4$). As illustrated in FIG. 5, BT54 deliberately gives up EV3 data transmission in originally reserved TX slot 55 because an acknowledgement for the transmitted EV3 data will not be successfully received in the next RX slot 56 due to interference from MWS53. In addition, BT54 also skips EV3 data reception in originally reserved RX slot 56 to save energy. Instead, BT54 performs data transmission and reception successfully in the next TX slot 57 and RX slot 58 in eSCO window #2.

A further improvement can be achieved when a BT master informs a BT slave that the BT master cannot perform RX operation in certain communication slots. As a result, the BT slave can also avoid null EV3 data transmission in these slots and thus save energy. As illustrate in FIG. 5, the BT slave is originally reserved to transmit EV3 data to BT master 54 in slot 56. Because the BT slave is informed that BT master 54 cannot perform data reception in this slot, the BT slave thus deliberately skips sending EV3 data in slot 56 to save energy.

From the above illustration, it can be seen that based on the traffic characteristics or traffic pattern of a co-located MWS radio module, a BT master and slave can selectively skip TX and RX slots to save energy. Because the traffic pattern for a co-located MWS radio module can be obtained by the BT device, such information can be shared between the BT master and slave to improve scheduling efficiency by avoiding affected communication slots. Furthermore, because the traffic pattern of an MWS radio module is repeated for every MWS frame, such information can be represented as a co-located coexistence (CLC) bitmap described below.

Figure 6:
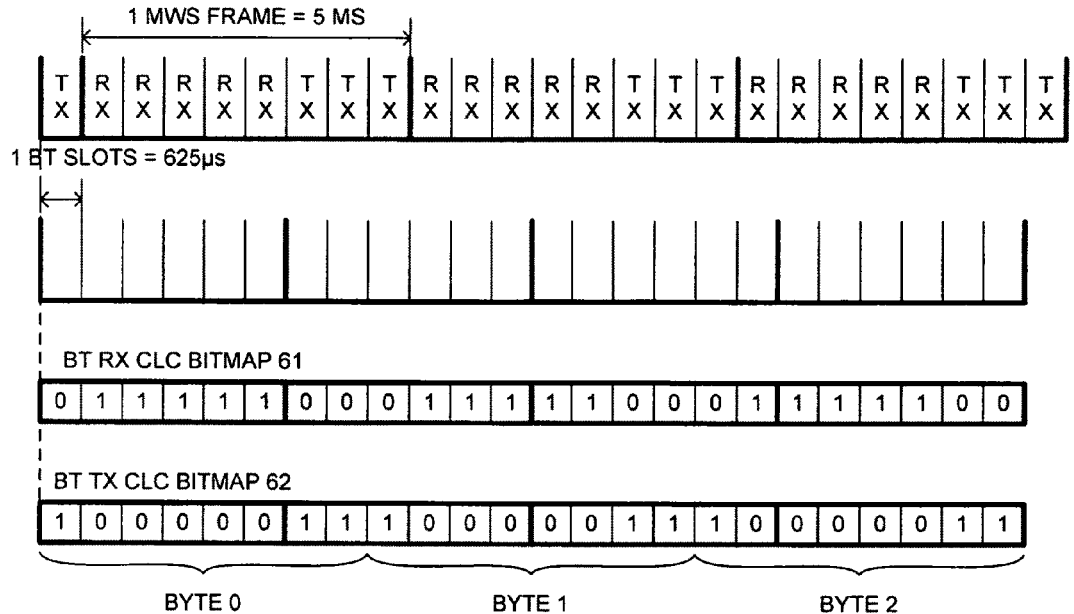
FIG. 6 illustrates a first example of CLC bitmap in accordance with one novel aspect.

FIG. 6 illustrates a first example of CLC bitmap in accordance with one novel aspect. In the example of FIG. 6, each MWS frame is 5 ms in length and contains eight communication slots including five RX slots followed by three TX slots. Each BT slot is 625 us in length. After frame synchronization, the MWS frames are aligned with BT slots in time domain. If data transmission of the co-located MWS radio module interferes with data reception of the BT device, then the BT device will not perform data reception in any of the MWS TX slots. As illustrated in FIG. 6, a BT RX CLC bitmap 61 is used to indicate whether a BT slot can be used to receive data. For example, a "1" bit indicates YES for data reception and a "0" bit indicates NO for data reception. Similarly, if data transmission of the BT device interferes with data reception of the co-located MWS radio module, then the BT device will not perform data transmission in any of the MWS RX slots. As a result, a BT TX CLC bitmap 62 in FIG. 6 is used to indicate whether a BT slot can be used to transmit data. Because every twenty-four BT slots are aligned with three MWS frames and the traffic pattern of the MWS radio module repeats for every frame, the 24-bit RX CLC bitmap 61 and TX CLC bitmap 62 are sufficient to represent packet scheduling information.

Figure 7:
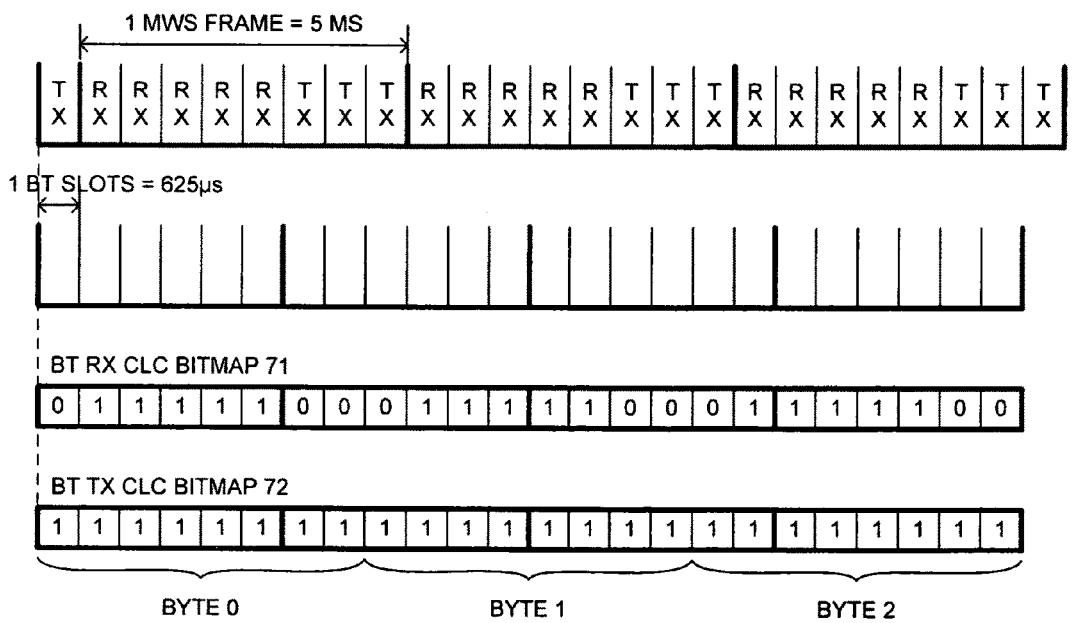
FIG. 7 illustrates a second example of CLC bitmap in accordance with one novel aspect.

FIG. 7 illustrates a second example of CLC bitmap in accordance with one novel aspect. The MWS frame and traffic pattern in FIG. 7 is the same as the MWS frame and traffic pattern illustrated in FIG. 6. In the example of FIG. 7, however, data transmission of the BT device does not interfere with data reception of the co-located MWS radio module. This is also referred to as hybrid mode, which normally occurs when the transmission power of the BT device is relatively low. Under the hybrid mode, BT RX CLC bitmap 71 in FIG. 7 remains the same as BT RX CLC bitmap 61 in FIG. 6. BT TX CLC bitmap 72, however, contains only "1" bits because every BT slot can be used to transmit data.

Figure 8:
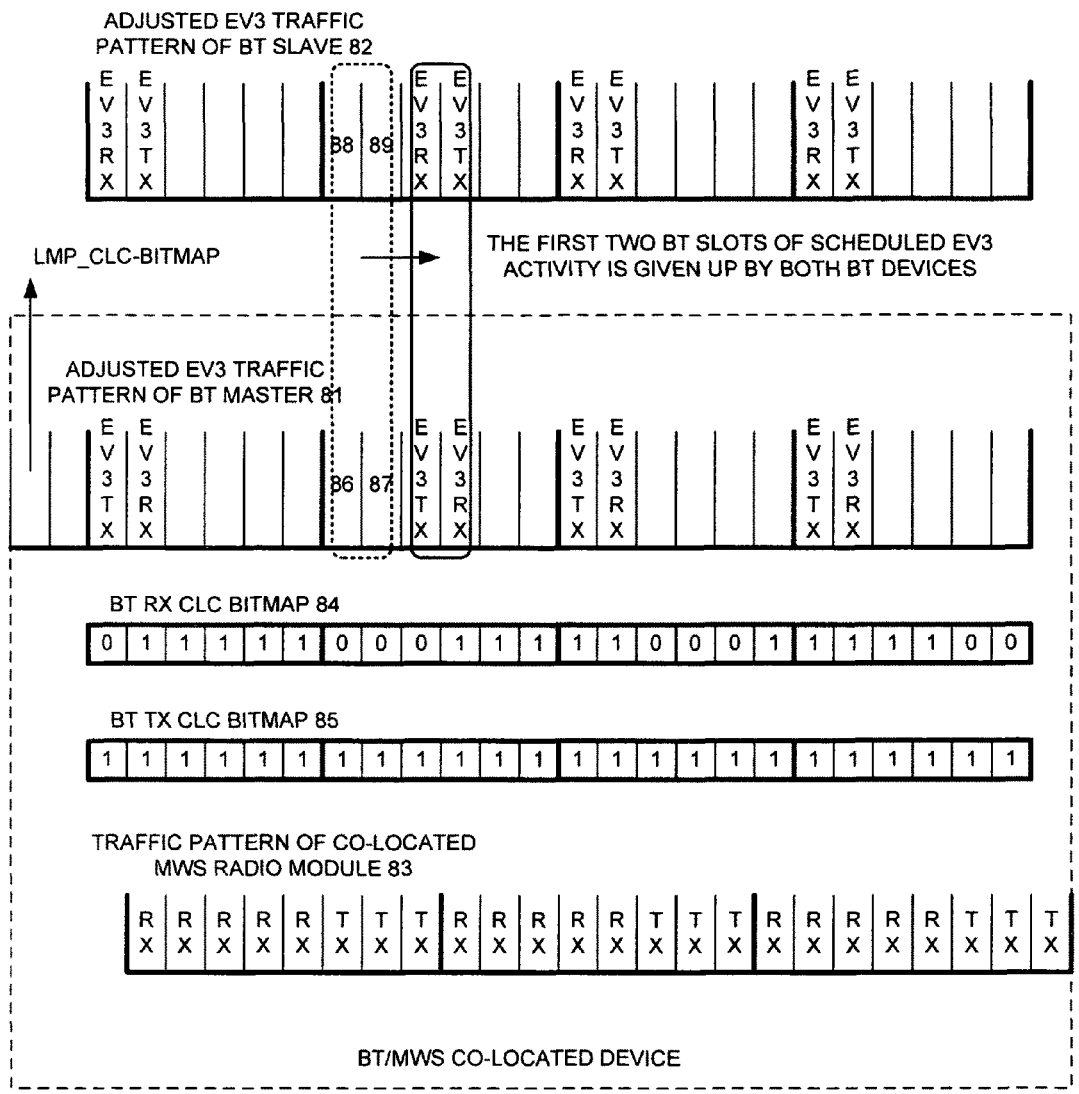
FIG. 8 illustrates the use of a CLC bitmap by a BT master device and a BT slave device.

FIG. 8 illustrates the use of CLC bitmaps by a BT master device 81 and a BT slave device 82. An eSCO link with $T_{eSCO}=6$ and $W_{eSCO}=4$ exists between them. In the example of FIG. 8, BT master 81 is co-located with an MWS radio module 83. MWS83 has a typical traffic pattern as illustrated in FIG. 7. Based on the traffic pattern, BT master 81 generates a BT RX CLC bitmap 84 and a BT TX CLC bitmap 85, both the same as BT RX CLC bitmap 71 and BT TX CLC bitmap 72 illustrated in FIG. 7 respectively. After the CLC bitmap information is generated by BT master 81, it is then transmitted to BT slave 82 via a Link Manager Protocol (LMP) message (e.g., LMP_CLC_BITMAP). As illustrated in FIG. 8, both BT master 81 and slave 82 have an EV3 traffic pattern, with originally scheduled EV3TX and EV3RX time slots at the beginning of each eSCO window. Based on the CLC bitmap information, BT master 81 skips the scheduled EV3 activity in slots 86 and 87. Similarly, BT slave 82 also skips the scheduled EV3 activity in slots 88 and 89. Instead, BT master 81 and BT slave 82 performs EV3TX and EV3RX in the next two communication slots. As a result, data transmission and reception under the adjusted EV3 traffic pattern of BT master 81 and BT slave 82 will not be interfered by co-located MWS radio module 83.

Figure 9:
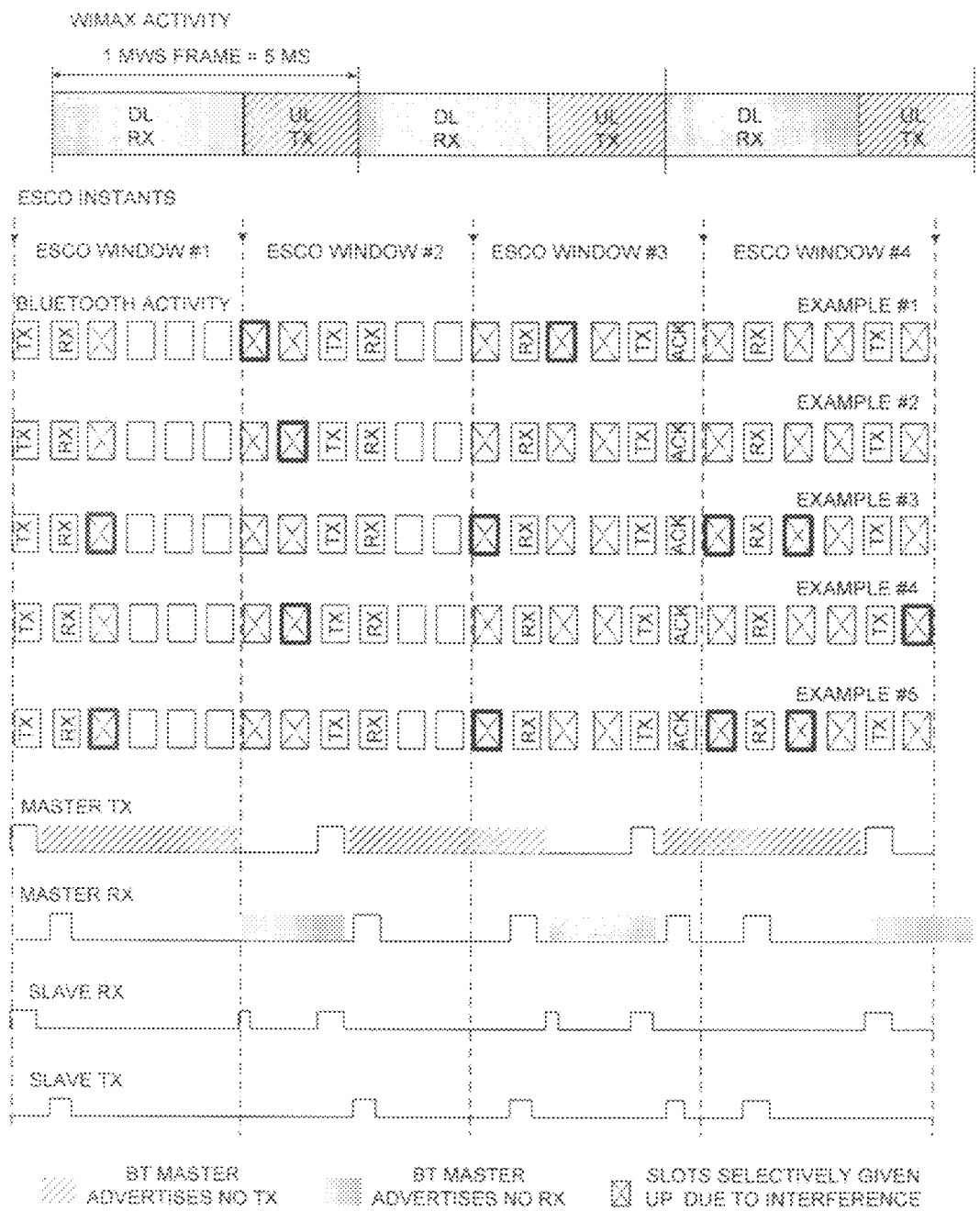
FIG. 9 illustrates different examples of selectively giving up scheduled communication slots by a BT master and a BT slave device.

FIG. 9 illustrates different examples of selectively skipping scheduled communication slots by a BT master and a peer BT slave device. The BT master is co-located with an MWS radio module having a typical WiMAX traffic pattern depicted at the top of FIG. 9. Based on the WiMAX traffic pattern, the BT master determines certain time slots that the BT master would not perform data transmission as denoted by area with slashed shading. Data transmission in these time slots would cause interference to the co-located MWS radio module because they overlap with the downlink receiving (DL RX) activity of the MWS radio module. Because the BT master would not perform data transmission in these time slots, it also implies that the same time slots should not be used for data reception by the peer BT slave. Similarly, the BT master determines certain time slots that the BT master will not perform data reception as denoted by areas with dotted shading. Data reception in these time slots would be interfered by the co-located MWS radio module because they overlap with the uplink transmitting (UL TX) activity of the MWS radio module. Because the BT master would not perform data reception in these time slots, it also implies that the same time slots should not be used for data transmission by the peer BT slave.

In a first example #1, the BT master device selectively gives up one or more scheduled TX slots if a corresponding acknowledgement (ACK) of the transmitted data cannot be received successfully due to interference. For instance, the first time slot in eSCO window #2 (denoted by a think-lined box) is originally scheduled for data transmission for the BT master, but is now skipped because the BT master knows that it cannot successfully receive an ACK for the transmitted data in the next slot.

In a second example #2, the BT slave device selectively gives up one or more scheduled TX slots if it is estimated that the data to be transmitted would not be received by its peer BT device successfully. For instance, the second time slot in eSCO window #2 (denoted by a think-lined box) is originally scheduled for data transmission for the BT slave, but is now skipped because the BT slave is informed that its peer BT master would not be able to receive the transmitted data successfully.

In a third example #3, the BT master device selectively gives up one or more scheduled TX slots if it is estimated that data transmission in those TX slots would interfere data reception of the co-located device. For instance, the first time slot in eSCO window #3 (denoted by a think-lined box) is originally scheduled for data transmission for the BT master, but is now skipped because the BT master knows that the transmitting operation would cause RX failure on the co-located MWS radio module.

In a fourth example #4, the BT master device selectively gives up one or more scheduled RX slots if the receiving operation would be affected by interference from the co-located MWS radio module. For instance, the second time slot in eSCO window #2 (denoted by a think-lined box) is originally scheduled for data reception for the BT master, but is now skipped because the BT master knows that it cannot successfully receiving data due to interference from the co-located MWS radio module.

In a fifth example #5, the BT slave device selectively gives up one or more scheduled RX slots if it is estimated that its peer BT device would not transmit data in those RX slots. For instance, the first time slot in eSCO window #3 (denoted by a think-lined box) is originally scheduled for data reception for the BT slave, but is now skipped because the BT slave is informed that its peer BT master would not transmit data in this slot.

Figure 10:
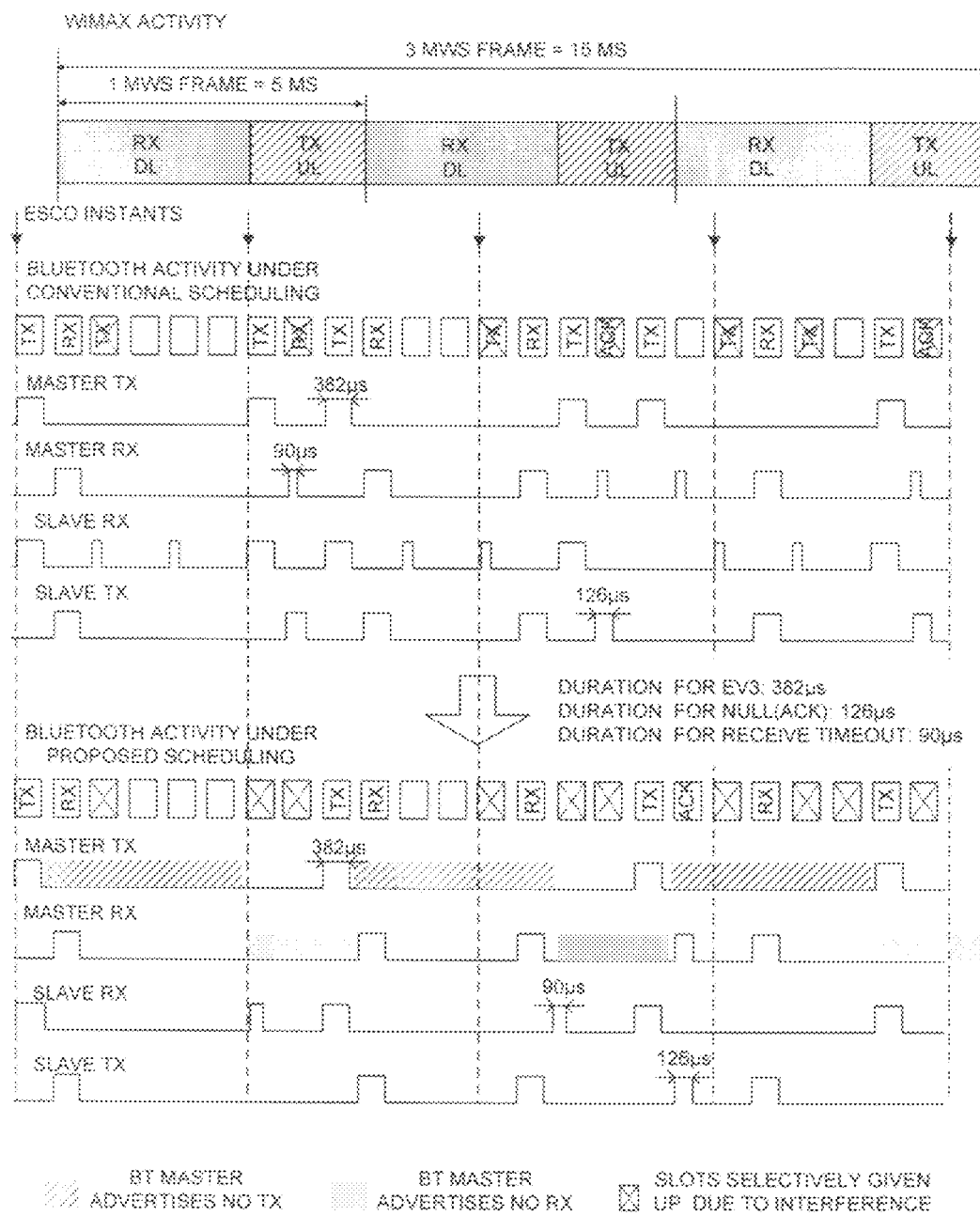
FIG. 10 illustrates the energy saving of a BT device with the proposed scheduling method.

FIG. 10 illustrates the energy saving of a BT master and slave with the proposed scheduling method. The top half of FIG. 10 illustrates WiMAX and BT activity with conventional eSCO solution using EV3 ($T_{eSCO}$=6, and $W_{eSCO}$=4). Under conventional scheduling, if a scheduled TX or RX slot fails because of interference, then the BT master and slave performs retransmission in the next available slots. Based on the waveforms of BT master TX, BT master RX, BT slave TX, and BT slave RX, the duty cycle of the BT master and BT slave can be calculated as:

$$D_{MASTER}=(10\times 382\ \mu s+4\times 90\ \mu s)/15\ ms=27.9\%$$

$$D_{SLAVE}=(10\times 382\ \mu s+2\times 126\ \mu s+6\times 90\ \mu s)/15\ ms=30.7\%$$

The bottom half of FIG. 10 illustrates WiMAX and BT activity with proposed eSCO solution using EV3 ($T_{eSCO}$=6, and $W_{eSCO}$=4). Under the proposed scheduling, if a scheduled TX or RX is estimated to fail because of interference, then the BT master and slave skip the scheduled slot and perform TX or RX in the next available slots. Because the skipped slot is given up for TX or RX operation, the transmitter or receiver is disabled or turned off during the skipped slot to save energy. Based on the waveforms of BT master TX, BT master RX, BT slave TX, and BT slave RX, the duty cycle of the BT master and BT slave can be calculated as:

$$D_{MASTER}=(8\times 382\ \mu s+126\ \mu s)/15\ ms=21.2\%$$

$$D_{SLAVE}=(8\times 382\ \mu s+2\times 90\ \mu s+126\ \mu s)/15\ ms=22.4\%$$

Thus, the proposed method for eSCO scheduling saves (27.9−21.2)/27.9≈24% energy for BT master, and saves (30.7−22.4)/30.7≈27% for BT slave.

Figure 11:
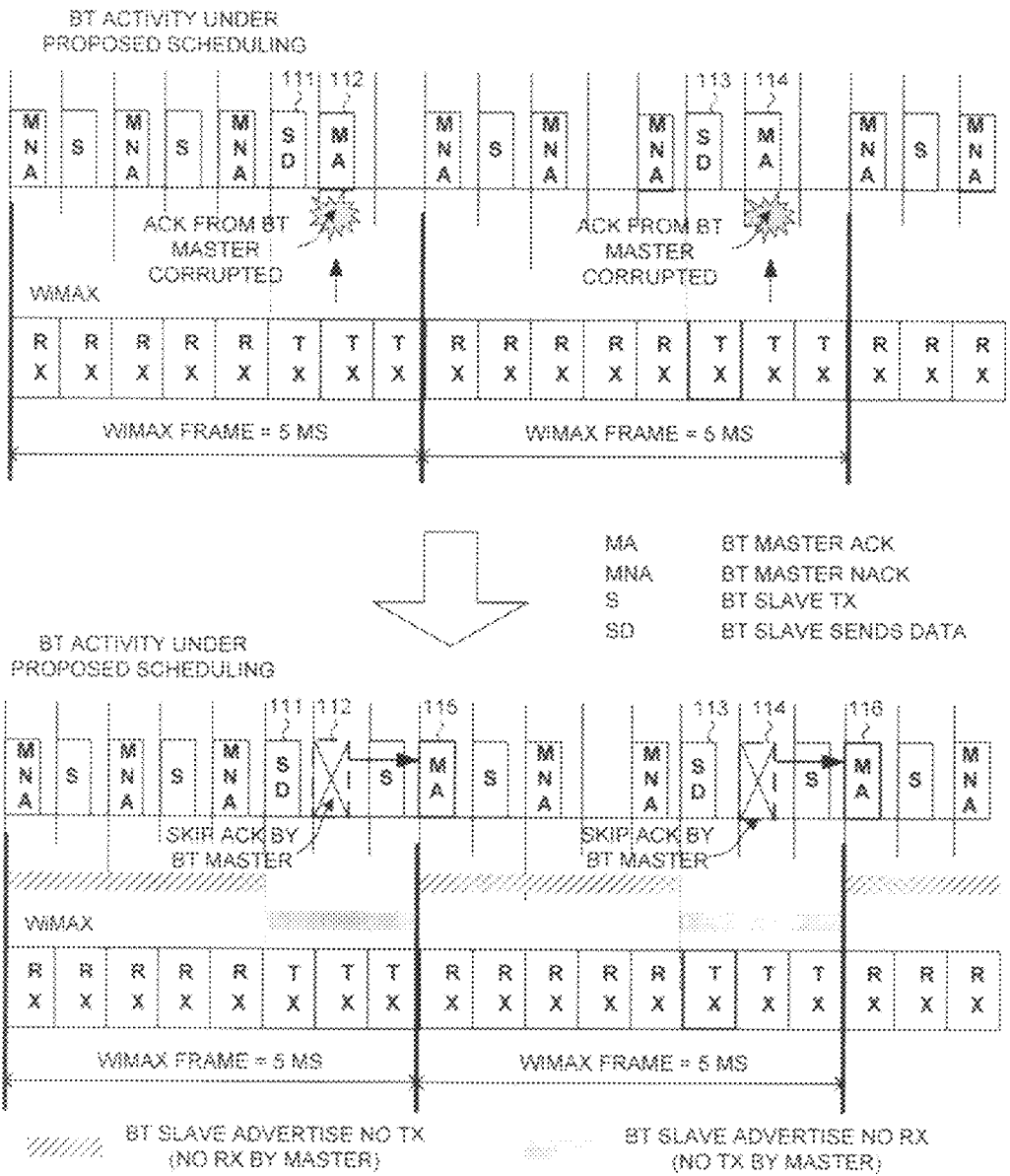
FIG. 11 illustrates a deadlock problem resolved with the proposed scheduling method.

FIG. 11 illustrates a deadlock problem and a solution under the proposed scheduling method. In the example of FIG. 11, a BT master communicates with a BT slave, and the BT slave is co-located with an MWS radio module having typical WiMAX traffic pattern. The communication slots marked with MNA and MA are TX slots for the BT master polling with NACK or ACK. The communication slots marked with SD and S are TX slots for the BT slave with or without sending data. The top half of FIG. 11 illustrates a deadlock problem under conventional packet scheduling method. When the BT slave transmits data in a first SD slot 111, the BT master transmits an ACK to acknowledge the transmitted data in the next corresponding MA slot 112. The ACK transmitted by the BT master, however, is corrupted due to interference from data transmission of the MWS radio module. Next time when the BT master transmits, it changes from ACK to NACK under Automatic Retransmission Request (ARQ) mechanism. Because the BT slave has never received an ACK for its transmitted data in slot 111, it attempts to retransmit the same data packet in the next SD slot 113. The BT master again transmits an ACK to the BT slave in the next MA slot 114. The ACK is again corrupted due to interference from the co-located MWS radio module. The same operation repeats thus deadlock forms.

The bottom half of FIG. 11 illustrates how the above-described deadlock problem is resolved by the proposed scheduling method. After the BT master receives data transmitted from the BT slave in the first SD slot 111, the BT master skips its next scheduled TX slot 112 for sending the ACK to the BT slave. This is because the BT master is informed by the BT slave that the BT slave cannot successfully receive data in slot 112 due to interference from the co-located MWS radio module. Instead, the BT master postpones the ACK transmission to the next TX slot 115, and the ACK is successfully received by the BT slave without interference from the MWS radio module. Thus, by deliberately giving up certain scheduled TX/RX slots, the scheduling deadlock problem is resolved.

Figure 12:
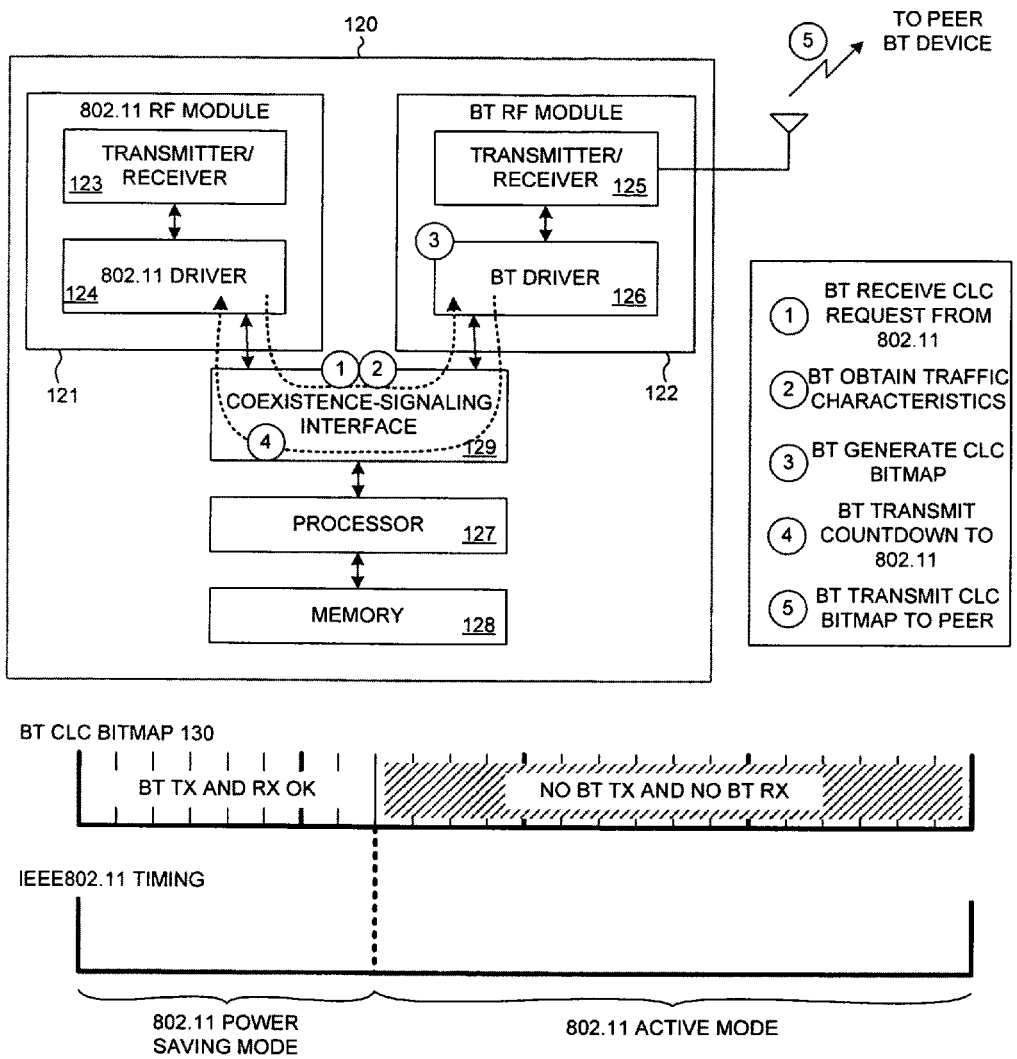
FIG. 12 illustrates a simplified block diagram of an MRT having an IEEE802.11-compatible device and a BT device in accordance with a novel aspect.

FIG. 12 illustrates a simplified block diagram of a MRT 120 having an IEEE802.11-compatible device Wi-Fi 121 and a BT device BT 122 in accordance with a novel aspect. Wi-Fi 121 comprises a transmitter and/or receiver 123 and a Wi-Fi driver 124. BT radio module 122 comprises a transmitter and/or receiver 125 and a BT driver 126. Wi-Fi driver 124 and BT driver 126 communicate with each other via a coexistence-signaling interface 129. Coexistence-signaling interface 129 is also connected to processor 127 and memory 128 of MRT 120. In the example of FIG. 12, Wi-Fi 121 is a Wi-Fi radio module that operates at 2.412-2.4835 GHz, while BT 122 is a BT radio module that operates at 2.402-2.480 GHz. Simultaneous operation of multiple radio modules co-located on the same physical device, however, can suffer significant degradation including significant interference between them because of the overlapping or adjacent radio spectrums. Thus, scheduling the transmission and reception of the co-located radio modules not to overlap in time domain can substantially reduce the interference between them and thereby increase system performance.

In one novel aspect, BT radio module 122 generates a CLC bitmap to be shared between Wi-Fi radio module 121 for packet scheduling such that the transmission and reception of the two radio modules do not overlap in time domain. As illustrated in FIG. 12, BT 122 first receives a CLC request from Wi-Fi 121 (step 1), and then obtains traffic characteristics and requirement, such as Wi-Fi 121 requests to use 50% of the time, from Wi-Fi 121 (step 2) via coexistence-signaling interface 129. Based on the traffic characteristics and requirement, BT 122 generates a co-located coexistence (CLC) bitmap and transmits the CLC bitmap back to Wi-Fi 121 (step 3). For example, BT CLC bitmap 130 in FIG. 12 indicates a number of pre-defined communication slots reserved by BT 122 to perform data transmission and reception. BT CLC bitmap 130 also indicates a time duration when BT 122 does not perform any TX or RX operation. In one embodiment, BT 122 transmits a countdown signal to WiFI 121 (step 4). Based on the CLC bitmap and the countdown signal, WiFi 121 enters active mode when BT122 does not perform TX or RX operation, and enters power-saving mode during the reserved communication slots to reduce interference. In addition, BT122 transmits CLC bitmap 130 to its peer BT device (step 5) such that the peer BT device performs TX or RX operation only during the reserved time slots.

Figure 13:
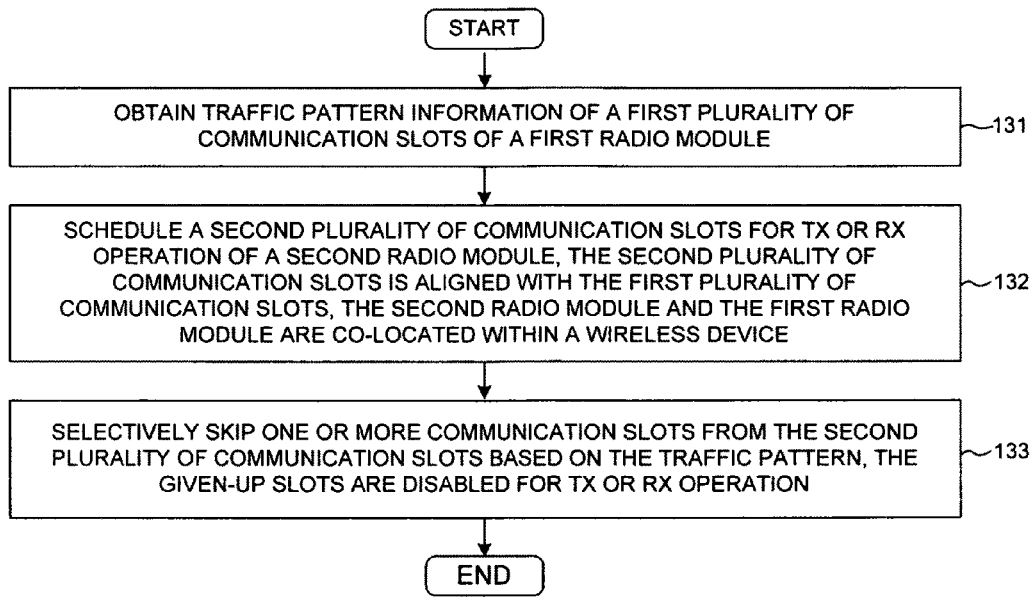
FIG. 13 is a flow chart of a method of scheduling TX and RX communication slots for co-located radio devices in accordance with one novel aspect.

FIG. 13 is a flow chart of a method of scheduling TX and RX communication slots for co-located radio devices in accordance with one novel aspect. In step 131, a BT radio module obtains traffic pattern information of another co-located radio module. In step 132, the BT radio module schedules its communication slots for TX and RX operation. The communication time slots of the BT radio module and the other radio module are aligned after frame synchronization. In step 133, the BT radio module selectively skips one or more TX and/or RX time slots based on the obtained traffic pattern information to avoid interference between the BT radio module and the co-located radio module. Instead, the BT radio module performs TX and RX operation during the time slots that are not affected by the co-located radio module. By deliberately giving up TX or RX time slots and disabling TX or RX operation during the skipped time slots, better scheduling efficiency and more energy saving is achieved for the BT radio module.

Figure 14:
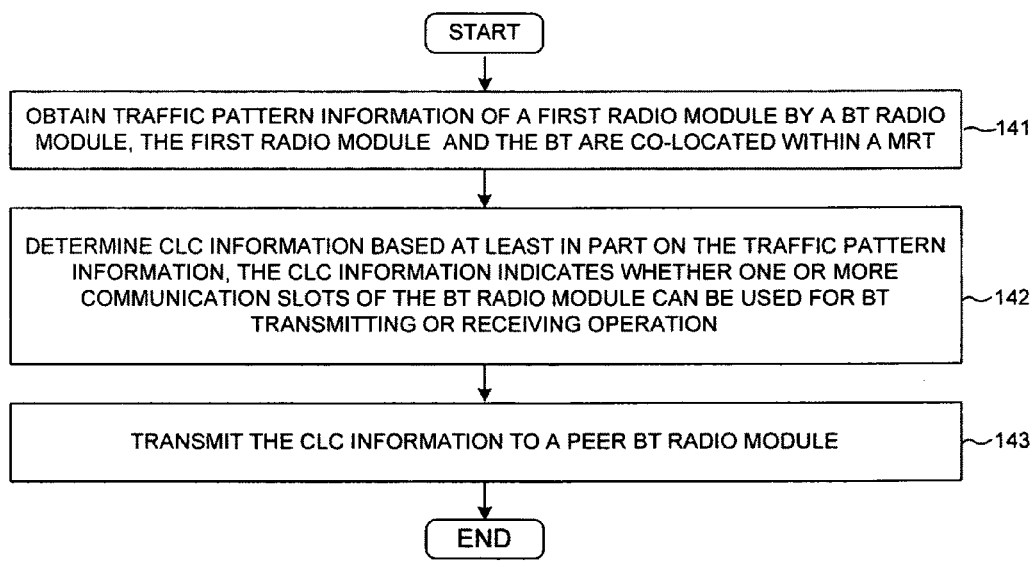
FIG. 14 is a flow chart of a method of generating CLC information for co-located radio devices in accordance with one novel aspect.

FIG. 14 is a flow chart of a method of generating CLC information for co-located radio devices in accordance with one novel aspect. In step 141, a BT radio module obtains traffic pattern information of a co-located radio module. In step 142, the BT radio module determines CLC information based on the traffic pattern information. The CLC information indicates whether one or more communication slots of the BT radio module can be used for TX or RX operation. In step 143, the BT radio module transmits the CLC information to its peer BT module such that the peer BT can more efficiently schedule its TX and RX operation and thereby save more energy.

Although the present invention has been described in connection with certain specific embodiments for instructional purposes, the present invention is not limited thereto. For example, although a WiMAX radio module and a Wi-Fi radio module are used in the detailed description, a Long Term Evolution (LTE) device may be used as a co-located radio module instead. In addition, the BT device co-located with another radio module may be either a BT master or a BT slave. Accordingly, various modifications, adaptations, and combinations of various features of the described embodiments can be practiced without departing from the scope of the invention as set forth in the claims.

What is claimed is:

1. A method comprising:
   obtaining traffic pattern information of a first plurality of communication slots of a first radio module;
   scheduling a second plurality of communication slots for transmitting (TX) or receiving (RX) operation of a second radio module, wherein the second plurality of communication slots is aligned with the first plurality of communication slots, and wherein the second radio module and the first radio module are co-located within a wireless communication device;
   selectively skipping one or more communication slots from the second plurality of communication slots based at least in part on the traffic pattern information, wherein the skipped slots are disabled for TX or RX operation.

2. The method of claim 1, wherein a transmit slot is skipped when an acknowledgement is estimated not to be received successfully in a corresponding receive slot due to interference from the first radio module.

3. The method of claim 1, wherein a transmit slot is skipped when data transmission performed in the transmit slot is estimated to interfere with data reception of the first radio module.

4. The method of claim 1, wherein a receive slot is skipped when data reception performed in the receive slot is estimated to be interfered by data transmission of the first radio module.

5. The method of claim 1, further comprising:
   determining Co-located Coexistence (CLC) information based at least in part on the traffic pattern information by the second radio module; and
   transmitting the CLC information to a peer radio module by the second radio module.

6. The method of claim 5, wherein one or more communication time slots is skipped to prevent from scheduling deadlock between the second radio module and the peer radio module.

7. The method of claim 5, wherein a transmit slot of the peer radio device is skipped when data transmitted in the transmit slot is estimated not to be received successfully by the second radio module due to interference from the first radio module.

8. The method of claim 5, wherein a receive slot of the peer radio device is skipped when the second radio module is estimated not to transmit any data in a corresponding transmit slot.

9. A wireless communication device, comprising:
   a first radio module comprising a first radio frequency (RF) transceiver that schedules a first plurality of communication slots for transmitting (TX) or receiving (RX) operation; and
   a co-located second radio module, comprising:
      a second RF transceiver that schedules a second plurality of communication slots for TX or RX operation, wherein the second plurality of slots is aligned with the first plurality of communication slots; and
      a driver control block that selectively skips one or more communication slots based at least in part on traffic pattern information of the first plurality of communication slots.

10. The wireless communication device of claim 9, wherein the wireless communication device is a Multi-Radio Terminal (MRT), wherein the first radio module is a Mobile Wireless Systems (MWS) radio module, and wherein the second radio module is a Bluetooth (BT) radio module.

11. The wireless communication device of claim 9, wherein the one or more communication slots of the second radio module are skipped to avoid interference between the first radio module and the second radio module.

12. The wireless communication device of claim 9, wherein the driver control block determines Co-located Coexistence (CLC) information based at least in part on the traffic pattern information, and wherein the second radio module transmits the CLC information to a peer radio module.

13. The wireless communication device of claim 12, wherein the one or more communication slots of the BT radio module is skipped to avoid scheduling deadlock between the BT radio module and the peer radio module.

14. The wireless communication device of claim 12, wherein the CLC information is represented by a CLC bitmap, each bit indicating whether an operation of a communication slot of the second radio module will be affected due to interference between the first radio module and the second radio module.

15. The wireless communication device of claim 12, wherein one or more communication slots of the peer radio module is selectively skipped based on the CLC information.

16. A method comprising:
- obtaining traffic characteristics of a first radio module by a Bluetooth (BT) radio module, wherein the first radio module is a mobile wireless system (MWS) module, and wherein the first radio module and the BT radio module are co-located within a Multi-Radio Terminal (MRT);
- determining Co-located Coexistence (CLC) information based at least in part on the traffic characteristics, wherein the CLC information indicates whether the BT radio module and the first radio module is estimated to interfere with each other in one or more communication slots, and wherein the BT radio module selectively skips one or more communication slots based on the CLC information; and
- transmitting the CLC information to a peer BT radio module.

17. The method of claim 16, wherein one or more communication slots of the peer BT radio module is selectively skipped based on the CLC information.

18. The method of claim 16, wherein the CLC information is represented by a CLC bitmap, each bit indicating whether an operation of the BT radio module and the MWS radio module will interfere with each other in a corresponding communication slot.

19. The method of claim 18, wherein the CLC bitmap is a transmit (TX) CLC bitmap, each bit indicating whether data transmission of the BT radio module will interfere with data reception of the MWS radio module in a corresponding communication slot.

20. The method of claim 18, wherein the CLC bitmap is a receive (RX) CLC bitmap, each bit indicating whether data reception of the BT radio module will be interfered by data transmission of the MWS radio module in a corresponding communication slot.

21. The method of claim 16, wherein the first radio module is an IEEE802.11-compatible radio module, and wherein the BT radio module receives a request to generating the CLC information.

22. The method of claim 21, wherein the CLC information indicates pre-defined communication slots reserved by the BT radio module.

23. The method of claim 22, wherein the CLC information is transmitted to the first radio module such that the first radio module enters power-saving mode during the reserved communication slots.

24. The method of claim 22, wherein a countdown time is transmitted to the first radio module such that the first radio module enters power-saving mode during the reserved communication slots.

25. An apparatus, comprising:
- a radio frequency (RF) transceiver that schedules a first plurality of communication slots for transmitting (TX) or receiving (RX) operation, wherein the first plurality of slots is aligned with a second plurality of communication slots of a co-located radio module; and
- a driver control block that selectively skips one or more communication slots based at least in part on traffic pattern information of the co-located radio module, and wherein TX or RX operation is disabled for the skipped communication slots.

26. The apparatus of claim 25, wherein the one or more communication slots are skipped to avoid interference with the co-located radio module.

27. The apparatus of claim 25, wherein the driver control block determines Co-located Coexistence (CLC) information based at least in part on the traffic pattern information, wherein the CLC information indicates whether the first plurality of communication slots can be used for TX or RX operation.

* * * * *